(12) United States Patent
Schips et al.

(10) Patent No.: US 8,741,973 B2
(45) Date of Patent: Jun. 3, 2014

(54) ELASTIC EXPANDED POLYMER FOAM BASED ON POLYOLEFIN/STYRENE POLYMER MIXTURES

(75) Inventors: Carsten Schips, Speyer (DE); Jens Aβmann, Mannheim (DE); Georg Gräβel, Ludwigshafen (DE); Geert Janssens, Friedelsheim (DE); Maximillian Hofmann, Mannheim (DE); Holger Ruckdäschel, St. Martin (DE); Jürgen Lambert, Gommersheim (DE); Christof Zylla, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 328 days.

(21) Appl. No.: 13/254,174

(22) PCT Filed: Mar. 1, 2010

(86) PCT No.: PCT/EP2010/052525
§ 371 (c)(1),
(2), (4) Date: Sep. 1, 2011

(87) PCT Pub. No.: WO2010/100101
PCT Pub. Date: Sep. 10, 2010

(65) Prior Publication Data
US 2011/0316198 A1 Dec. 29, 2011

(30) Foreign Application Priority Data
Mar. 5, 2009 (EP) ..................... 09154432

(51) Int. Cl.
*C08L 25/06* (2006.01)
*C08J 9/16* (2006.01)

(52) U.S. Cl.
USPC ............. 521/56; 521/134; 521/139; 521/140; 521/142; 521/146; 521/150; 525/98; 525/99; 525/232; 525/240; 525/241

(58) Field of Classification Search
USPC ........... 521/56, 139, 134, 140, 142, 146, 150; 525/98, 99, 232, 240, 241
See application file for complete search history.

(56) References Cited

U.S. PATENT DOCUMENTS

| | | | |
|---|---|---|---|
| 5,496,864 A * | 3/1996 | Henn et al. | ............ 521/59 |
| 6,031,053 A | 2/2000 | Knoll et al. | |
| 6,130,265 A | 10/2000 | Glueck et al. | |
| 6,197,889 B1 | 3/2001 | Knoll et al. | |
| 6,340,713 B1 | 1/2002 | Gluck et al. | |
| 6,521,712 B1 | 2/2003 | Knoll et al. | |
| 2004/0152795 A1 | 8/2004 | Arch et al. | |
| 2007/0112081 A1 | 5/2007 | Hahn et al. | |
| 2008/0224357 A1 | 9/2008 | Allmendinger et al. | |
| 2010/0143697 A1 | 6/2010 | Schips et al. | |
| 2010/0190877 A1 | 7/2010 | Schips et al. | |
| 2011/0065819 A1 | 3/2011 | Schips et al. | |

FOREIGN PATENT DOCUMENTS

| | | |
|---|---|---|
| DE | 24 13 375 A1 | 10/1975 |
| DE | 24 13 408 A1 | 10/1975 |
| DE | 38 14 783 A1 | 11/1989 |
| EP | 0654488 A1 | 5/1995 |
| EP | 981574 A1 | 3/2000 |
| EP | 981575 A1 | 3/2000 |
| JP | 54-063170 A * | 5/1979 |
| WO | WO-95/35335 A1 | 12/1995 |
| WO | WO-97/40079 A1 | 10/1997 |
| WO | WO-00/58380 A1 | 10/2000 |
| WO | WO-2004/065468 A1 | 8/2004 |
| WO | WO-2005/056652 A1 | 6/2005 |
| WO | WO-2005/092959 A1 | 10/2005 |
| WO | WO-2006/099631 A1 | 9/2006 |
| WO | WO-2007/023089 A1 | 3/2007 |
| WO | WO-2008/050909 A1 | 5/2008 |
| WO | WO-2008/125250 A1 | 10/2008 |
| WO | WO-2009/000872 A1 | 12/2008 |
| WO | WO 2009/112549 | 9/2009 |
| WO | WO-2009/112549 A1 | 9/2009 |
| WO | WO 2010/012702 | 2/2010 |
| WO | WO 2010/076185 | 7/2010 |

OTHER PUBLICATIONS

U.S. Appl. No. 13/142,987, filed Jun. 30, 2011, Schips et al.
U.S. Appl. No. 13/143,029, filed Jun. 30, 2011, Schips et al.

* cited by examiner

*Primary Examiner* — Irina S Zemel
(74) *Attorney, Agent, or Firm* — Drinker Biddle & Reath LLP

(57) ABSTRACT

The invention relates to elastic expanded polymer foams and also a process for producing expanded polymer foams by sintering a mixture comprising foam particles P1 and P2 composed of different thermoplastic polymers or polymer blends, wherein the foam particles P1 are obtained by prefoaming expandable, thermoplastic polymer particles comprising A) from 45 to 97.9 percent by weight of a styrene polymer,
B1) from 1 to 45 percent by weight of a polyolefin having a melting point in the range from 105 to 140° C.,
B2) from 0 to 25 percent by weight of a polyolefin having a melting point below 105° C.,
C1) from 0.1 to 25 percent by weight of a styrene-butadiene or styrene-isoprene block copolymer,
C2) from 0.0 to 10 percent by weight of a styrene-ethylene-butylene block copolymer,
D) from 1 to 15 percent by weight of a blowing agent,
E) from 0 to 5 percent by weight of a nucleating agent,
where the sum of A) to E) is 100% by weight.

11 Claims, No Drawings

ELASTIC EXPANDED POLYMER FOAM BASED ON POLYOLEFIN/STYRENE POLYMER MIXTURES

CROSS-REFERENCE TO RELATED APPLICATIONS

This application is a national stage application (under 35 U.S.C. §371) of PCT/EP2010/052525, filed Mar. 1, 2010, which claims benefit of European application 09154432.0, filed Mar. 5, 2009.

BACKGROUND OF THE INVENTION

The invention relates to elastic expanded polymer foams and also a process for producing them by sintering a mixture comprising foam particles P1 and P2 composed of different thermoplastic polymers or polymer blends.

Polystyrene foams are rigid foams. Their low elasticity is a disadvantage for many applications, for example in the packaging sector, since only unsatisfactory protection of the packaged goods against impact and shock stress is possible and the foam moldings used as packaging material break even at a low deformation, resulting in the protective effect of the foam under renewed stress being lost. There have therefore already been attempts in the past to increase the elasticity of polystyrene foams.

Expandable polymer mixtures of styrene polymers, polyolefins and if appropriate compatibilizers such as hydrogenated styrene-butadiene block copolymers are known, for example, from DE 24 13 375, DE 24 13 408 or DE 38 14 783. The foams which can be obtained therefrom are said to have better mechanical properties, in particular better elasticity and lower brittleness at low temperatures, compared to foams composed of styrene polymers and also insensitivity to solvents such as ethyl acetate and toluene. However, the blowing agent retention capability and the foamability of the expandable polymer mixtures to low densities are not sufficient for processing.

WO 2005/056652 describes expanded polymer foam moldings having a density in the range from 10 to 100 g/l which can be obtained by fusion of prefoamed foam particles derived from expandable, thermoplastic polymer pellets. The polymer pellets comprise mixtures of styrene polymers and other thermoplastic polymers and can be obtained by melt impregnation and subsequent pressurized underwater pelletization.

Elastic expanded polymer foams produced from expandable interpolymer particles are also known (e.g. US 2004/0152795 A1). The interpolymers can be obtained by polymerization of styrene in the presence of polyolefins in aqueous suspension and form an interpenetrating network of styrene polymers and olefin polymers. However, the blowing agent quickly diffuses out of the expandable polymer particles, so that they have to be stored at low temperatures and display satisfactory foamability for only a short time.

WO 2008/050909 describes elastic expanded polymer foams composed of expanded interpolymer particles having a core-shell structure, where the core comprises a polystyrene-polyolefin interpolymer and the shell comprises a polyolefin. These expanded polymer foams have improved elasticity and cracking resistance compared to EPS and are used first and foremost as transport packaging or as energy absorber in automobile applications.

WO 2005/092959 describes nanoporous polymer foams which can be obtained from blowing agent-comprising, multiphase polymer mixtures having domains in the range from 5 to 200 nm. The domains preferably comprise a core-shell particle which can be obtained by emulsion polymerization and in which the solubility of the blowing agent is at least twice as high as in the adjoining phases.

A new class of thermoplastic expanded polymer foams which have cells having an average cell size in the range from 20 to 500 µm and in which the cell membranes have a nanocellular or fibrous structure having pore or fiber diameters below 1500 nm has been described in WO 2008/125250.

The known cracking-resistant foams, for example derived from expanded polyolefins, expanded interpolymers or expandable interpolymers, are generally incompatible with or have only low compatibility with prefoamed, expandable polystyrene (EPS) particles. In processing to produce moldings such as foam blocks, poor fusion of the different foam particles is frequently observed.

BRIEF SUMMARY OF THE INVENTION

It was an object of the present invention to remedy the abovementioned disadvantages and provide elastic expanded polymer foams which are based on polyolefin/styrene polymer mixtures and have a high compressive and flexural strength and energy absorption comparable to conventional expanded polymer foams derived from expandable polystyrene (EPS) and at the same time have a significantly improved elasticity, cracking resistance and work of flexure, and also a process for producing them.

We have accordingly found a process for producing expanded polymer foams by sintering a mixture comprising foam particles P1 and P2 composed of different thermoplastic polymers or polymer blends, wherein the foam particles P1 are obtained by prefoaming expandable, thermoplastic polymer particles comprising
A) from 45 to 97.9 percent by weight of a styrene polymer,
B1) from 1 to 45 percent by weight of a polyolefin having a melting point in the range from 105 to 140° C.,
B2) from 0 to 25 percent by weight of a polyolefin having a melting point below 105° C.,
C1) from 0.1 to 25 percent by weight of a styrene-butadiene or styrene-isoprene block copolymer,
C2) from 0.0 to 10 percent by weight of a styrene-ethylene-butylene block copolymer,
D) from 1 to 15 percent by weight of a blowing agent,
E) from 0 to 5 percent by weight of a nucleating agent,
where the sum of A) to E) is 100% by weight.

The invention also provides the expanded polymer foams which can be obtained by the process.

Preferred foam particles P1 are obtained by prefoaming expandable, thermoplastic polymer particles comprising
A) from 55 to 78.1 percent by weight of a styrene polymer,
B1) from 7 to 15 percent by weight of a polyolefin having a melting point in the range from 105 to 140° C.,
B2) from 5 to 10 percent by weight of a polyolefin having a melting point below 105° C.,
C1) from 6 to 15 percent by weight of a styrene-butadiene or styrene-isoprene block copolymer,
C2) from 0.8 to 3 percent by weight of a styrene-ethylene-butylene block copolymer,
D) from 3 to 10 percent by weight of a blowing agent,
E) from 0.3 to 2 percent by weight of a nucleating agent,
where the sum of A) to E) is 100% by weight.

A DETAILED DESCRIPTION OF THE INVENTION

The expandable, thermoplastic polymer particles from which the foam particles B1 are obtained by prefoaming particularly preferably consist of the components A) to E). The blowing agent (component D) has essentially been given off from the foam particles during prefoaming.

Foam Particles P1:

The expandable thermoplastic polymer particles comprise from 45 to 97.9% by weight, preferably from 55 to 78.1% by weight, of a styrene polymer A) such as general purpose polystyrene (GPPS) or high-impact polystyrene (HIPS) or styrene-acrylonitrile copolymers (SAN) or acrylonitrile-butadiene-styrene copolymers (ABS) or mixtures thereof. The expandable, thermoplastic polymer particles used for producing the foam particles P1 preferably comprise general purpose polystyrene (GPPS) as styrene polymer A). Particular preference is given to using general purpose polystyrene grades having weight average molecular weights in the range from 120 000 to 300 000 g/mol, in particular from 190 000 to 280 000 g/mol, determined by gel permeation chromatography, and a melt volume rate MVR (200° C./5 kg) in accordance with ISO 113 in the range from 1 to 10 cm$^3$/10 min, for example PS 158 K, 168 N or 148 G from BASF SE. To improve fusion of the foam particles in processing to give the molding, grades which flow readily, for example Empera® 156L (Innovene), can be added.

As further components B), the expandable thermoplastic polymer particles comprise polyolefins B1) having a melting point in the range from 105 to 140° C. and polyolefins B2) having a melting point below 105° C. The melting point is the melting peak determined by means of DSC (dynamic scanning calorimetry) at a heating rate of 10° C./minute.

The expandable, thermoplastic polymer particles comprise from 1 to 45 percent by weight, in particular from 7 to 15 percent by weight, of a polyolefin B1). As polyolefin B1), preference is given to using a homopolymer or copolymer of ethylene and/or propylene having a density in the range from 0.91 to 0.98 g/l (determined in accordance with ASTM D792), in particular polyethylene. Possible polypropylenes are, in particular, injection molding grades. Possible polyethylenes are commercially available homopolymers of ethylene, e.g. LDPE (injection molding grades), LLDPE, HDPE, or copolymers of ethylene and propylene (e.g. Moplen® RP220 and Moplen® RP320 from Basell or Versify® grades from Dow), ethylene and vinyl acetate (EVA), ethylene-acrylates (EA) or ethylene-butylene acrylates (EBA). The melt volume index MVI (190° C./2.16 kg) of the polyethylenes is usually in the range from 0.5 to 40 g/10 min and the density is in the range from 0.91 to 0.95 g/cm$^3$. In addition, it is possible to use blends with polyisobutene (FIB) (e.g. Oppanol® B150 from BASF Aktiengesellschaft). Particular preference is given to using LLDPE having a melting point in the range from 110 to 125° C. and a density in the range from 0.92 to 0.94 g/l.

Further polymers suitable as component B1) are olefin block copolymers composed of a polyolefin block PB1 (hard block) and a polyolefin block PB2 (soft block), as are described, for example, in WO 2006/099631. The polyolefin block PB1 preferably comprises from 95 to 100% by weight of ethylene. The PB2 block preferably comprises ethylene and α-olefin, with possible α-olefins being styrene, propylene, 1-butene, 1-hexene, 1-octene, 4-methyl-1-pentene, norbornenes, 1-decene, 1,5-hexadiene or mixtures thereof. The PB2 block is preferably an ethylene-α-olefin copolymer block having from 5 to 60% by weight of α-olefin, in particular an ethylene-octene copolymer block. Preference is given to multiblock copolymers of the formula (PB1-PB2)n, where n is an integer from 1 to 100. The blocks PB1 and PB2 essentially form a linear chain and preferably alternate or are randomly distributed. The proportion of the PB2 blocks is preferably from 40 to 60% by weight, based on the olefin block copolymer. Particular preference is given to olefin block copolymers having alternating, hard PB1 blocks and soft, elastomeric PB2 blocks, which are commercially available under the name INFUSE®.

The blowing agent retention capability increases significantly with a reduced proportion of polyolefin B1). The storage life and the processibility of the expandable, thermoplastic polymer particles are thus significantly improved. In the range from 4 to 20% by weight of polyolefin, expandable thermoplastic polymer particles having a long storage life are obtained, without the elastic properties of the expanded polymer foam produced therefrom deteriorating. This is shown, for example, by a reduced demolding set $\epsilon_{set}$ in the range from 25 to 35%.

As polyolefin B2), the expandable, thermoplastic polymer particles comprise from 0 to 25 percent by weight, in particular from 1 to 10% by weight, of a polyolefin B2) having a melting point below 105° C. The polyolefin B2) preferably has a density in the range from 0.86 to 0.90 g/l (determined in accordance with ASTM D792). Polyolefins suitable for this purpose are, in particular, thermoplastic elastomers based on olefins (TPO). Particular preference is given to ethylene-octene copolymers which are, for example, commercially available under the trade name Engage® 8411 from Dow. Expandable, thermoplastic polymer particles comprising the component B2) display, after processing to produce foam moldings, a significant improvement in the work of flexure and ultimate tensile strength.

It is known from the field of multiphase polymer systems that most polymers are immiscible or only slightly miscible with one another (Flory), so that, depending on temperature, pressure and chemical composition, demixing into the respective phases occurs. If incompatible polymers are covalently bound to one another, demixing does not occur on a macroscopic level but only on a microscopic level, i.e. the length range of the single polymer chain. This is therefore referred to as microphase separation. It results in many mesoscopic structures, e.g. lamellar, hexagonal, cubic and bicontinuous morphologies, which have a strong relationship to lyotropic phases.

To set the desired morphology in a targeted manner, compatibilizers (components C) are used according to the invention. A further improvement in the compatibility is achieved by use of a mixture of styrene-butadiene or styrene-isoprene block copolymers as component C1) and styrene-ethylene-butylene block copolymers (SEPS) as component C2).

The compatibilizers lead to improved adhesion between the polyolefin-rich phase and the styrene polymer-rich phase and even in small amounts improve the elasticity of the foam significantly compared to conventional EPS foams. Studies on the domain size of the polyolefin-rich phase showed that the compatibilizer stabilizes small droplets by reducing the surface tension.

Electron micrographs of a section through a blowing agent-comprising, expandable polystyrene/polyethylene mixture showed disperse polyethylene domains in the polystyrene matrix.

The expandable, thermoplastic polymer particles comprise from 0.1 to 25 percent by weight, in particular from 6 to 15% by weight, of a styrene-butadiene or styrene-isoprene block copolymer as component C1).

Block copolymers which are suitable for this purpose are, for example, styrene-butadiene or styrene-isoprene block copolymers. The total diene content is preferably in the range from 20 to 60% by weight, particularly preferably in the range from 30 to 50% by weight, and the total styrene content is correspondingly preferably in the range from 40 to 80% by weight, particularly preferably in the range from 50 to 70% by weight.

Suitable styrene-butadiene block copolymers comprising at least two polystyrene blocks S and at least one styrene-butadiene copolymer block S/B are, for example, block copolymers having star-like branching, as are described in EP-A-0654488.

Also suitable are block copolymers having at least two hard blocks $S_1$ and $S_2$ composed of vinylaromatic monomers and at least one random soft block B/S which is located in between and is composed of vinylaromatic monomers and diene, where the proportion of the hard blocks is above 40% by weight, based on the total block copolymer, and the 1,2-vinyl content of the soft block B/S is below 20%, as are described in WO 00/58380.

Further suitable compatibilizers are linear styrene-butadiene block copolymers which have the general structure S-(S/B)-S and have one or more blocks $(S/B)_{random}$ located between the two S blocks and having a random styrene/butadiene distribution. Such block copolymers can be obtained by anionic polymerization in a nonpolar solvent with addition of a polar cosolvent or a potassium salt, as described, for example, in WO 95/35335 or WO 97/40079.

For the purposes of the present invention, the vinyl content is the relative proportion of 1,2 linkages of the diene units, based on the sum of 1,2-, 1,4-cis- and 1,4-trans-linkages. The 1,2-vinyl content of the styrene-butadiene copolymer block (S/B) is preferably below 20%, in particular in the range from 10 to 18%, particularly preferably in the range from 12 to 16%.

Preference is given to using styrene-butadiene-styrene (SBS) triblock copolymers which have a butadiene content of from 20 to 60% by weight, preferably from 30 to 50% by weight, and may be partially hydrogenated or unhydrogenated as compatibilizers. These are commercially available, for example under the trade name Styroflex® 2G66, Styrolux® 3G55, Styroclear® GH62, Kraton® D 1101, Kraton® D 1155, Tuftec® H1043 or Europren® SOL T6414. These are SBS block copolymers having sharp transitions between B blocks and S blocks.

As component C2), the expandable, thermoplastic polymer particles comprise from 0 to 10 percent by weight, in particular from 0.8 to 3% by weight, of a styrene-ethylene-butylene block copolymer (SEBS). Suitable styrene-ethylene-butylene block copolymers (SEBS) are, for example, those which can be obtained by hydrogenation of the olefinic double bonds of the block copolymers C1). Suitable styrene-ethylene-butylene block copolymers are, for example, the commercially available Kraton® G grades, in particular Kraton® G 1650.

Furthermore, additives, nucleating agents, plasticizers, halogen-comprising or halogen-free flame retardants, soluble and insoluble inorganic and/or organic dyes and pigments, fillers or co-blowing agents can be added to the multiphase polymer mixture in amounts which do not adversely affect domain formation and the resulting foam structure.

A component E), the expandable, thermoplastic polymer particles comprise from 0 to 5 percent by weight, preferably from 0.3 to 2 percent by weight, of a nucleating agent, for example talc.

As blowing agent (component D), the expandable, thermoplastic polymer particles comprise from 1 to 15 percent by weight, preferably from 3 to 10 percent by weight, based on the sum of all components A) to E), of a physical blowing agent. The blowing agents can be gaseous or liquid at room temperature (from 20 to 30° C.) and atmospheric pressure. They should have a boiling point below the softening temperature of the polymer mixture, usually in the range from −40 to 80° C., preferably in the range from −10 to 40° C. Suitable blowing agents are, for example, halogenated or halogen-free aliphatic hydrocarbons, alcohols, ketones or ethers. Suitable aliphatic blowing agents are, for example, aliphatic $C_3$-$C_8$-hydrocarbons such as n-propane, n-butane, isobutane, n-pentane, isopentane, n-hexane, neopentane, cycloaliphatic hydrocarbons such as cyclobutane and cyclopentane, halogenated hydrocarbons, such as methyl chloride, ethyl chloride, methylene chloride, trichlorofluoromethane, dichlorofluoromethane, dichlorodifluoromethane, chlorodifluoromethane, dichlorotetrafluoroethane and mixtures thereof. Preference is given to the halogen-free blowing agents isobutane, n-butane, isopentane, n-pentane, neopentane, cyclopentane and mixtures thereof.

Suitable coblowing agents are those having a relatively low selectivity of the solvent capability for the domain-forming phase, for example gases such as $CO_2$, $N_2$, fluorinated hydrocarbons or noble gases. These are preferably used in amounts of from 0 to 10% by weight, based on the expandable, thermoplastic polymer particles.

The polymer mixture having a continuous phase and a disperse phase can be produced by mixing two incompatible thermoplastic polymers, for example in an extruder.

The expandable thermoplastic polymer particles can be obtained by a process in which a) a polymer mixture having a continuous phase and a disperse phase is produced by mixing the components A) to C) and, if appropriate, E), b) this mixture is impregnated with a blowing agent D) and pelletized to form expandable thermoplastic polymer particles c) and pelletized to form expandable, thermoplastic polymer particles by underwater pelletization at a pressure in the range from 1.5 to 10 bar.

The average diameter of the disperse phase in the polymer mixture produced in step a) is preferably in the range from 1 to 2000 nm, particularly preferably in the range from 100 to 1500 nm.

In a further embodiment, it is also possible in step b) firstly to pelletize the polymer mixture and subsequently after-impregnate the pellets with a blowing agent D) in an aqueous phase under superatmospheric pressure and at elevated temperature to form expandable thermoplastic polymer particles. These can subsequently be isolated after cooling to below the melting point of the polymer matrix or be obtained directly as prefoamed foam particles by depressurization.

Particular preference is given to a continuous process in which a thermoplastic styrene polymer A) which forms the continuous phase, for example polystyrene, is melted in a twin-screw extruder and mixed with polyolefins B1) and B2) which form the disperse phase and also the compatibilizers C1) and C2) and, if appropriate, nucleating agent E) to form the polymer mixture in step a) and the polymer melt is subsequently conveyed through one or more static and/or dynamic mixing elements and impregnated with the blowing agent D) in step b). The blowing agent-laden melt can subsequently be extruded through an appropriate nozzle to give foam boards, extrudates or particles and cut.

The melt exiting from the nozzle can also be cut directly by means of underwater pelletization (UWP) to form expandable polymer particles or polymer particles which have been partially foamed in a targeted manner. Setting of a suitable counterpressure and a suitable temperature in the waterbath of the UWP thus makes it possible to produce foam particles in a targeted manner.

To produce the expandable polymer particles, the underwater pelletization is generally carried out at pressures in the range from 1.5 to 10 bar. The die plate generally has a plurality of nests having a plurality of holes. At a hole diameter in the range from 0.2 to 1 mm, expandable polymer particles having a preferred average particle diameter in the range from 0.5 to 1.5 mm are obtained. Expandable polymer particles having a narrow particle size distribution and an average particle diameter in the range from 0.6 to 0.8 mm lead, after prefoaming, to better filling of the automatic molding machine having a more filigree geometry of the molding. Furthermore, this gives a better surface of the molding with a lower volume of interstices.

A preferred polymer mixture is obtained in step a) by mixing

A) from 45 to 97.9 percent by weight, in particular from 55 to 78.1% by weight, of styrene polymers,
B1) from 1 to 45 percent by weight, in particular from 7 to 15% by weight, of a polyolefin having a melting point in the range from 105 to 140° C.,
B2) from 0 to 25 percent by weight, in particular from 5 to 10% by weight, of a polyolefin having a melting point below 105° C.,
C1) from 0.1 to 25 percent by weight, in particular from 6 to 15% by weight, of a styrene-butadiene or styrene-isoprene block copolymer,
C2) from 0 to 10 percent by weight, in particular from 0.8 to 3% by weight, of a styrene-ethylene-butylene block copolymer,
E) from 0 to 5 percent by weight, in particular from 0.3 to 2% by weight, of a nucleating agent and impregnated in step b) with from 1 to 15% by weight, in particular from 3 to 10% by weight, of a blowing agent D), where the sum of A) to E) is 100% by weight, and pelletized in step c).

To improve the processability, the finished expandable thermoplastic polymer particles can be coated with glycerol esters, antistatics or anticonglutination agents.

The round or oval particles obtained are preferably foamed to a diameter in the range from 0.2 to 10 mm. Their bulk density is preferably in the range from 10 to 100 g/l.

The fusion of the prefoamed foam beads to give the molding and the mechanical properties resulting therefrom are improved by, in particular, coating the expandable thermoplastic polymer particles with a glyceryl stearate. Particular preference is given to using a coating composed of from 50 to 100% by weight of glyceryl tristearate (GTS), from 0 to 50% by weight of glyceryl monostearate (GMS) and from 0 to 20% by weight of silica.

The expandable, thermoplastic polymer particles can be prefoamed by means of hot air or steam to give foam particles having a density in the range from 8 to 200 kg/m$^3$, preferably in the range from 10 to 80 kg/m$^3$ and subsequently fused in a closed mold to give foam moldings. Here, the processing pressure is selected at a sufficiently low value that the domain structure in the cell membranes is retained. A gauge pressure in the range from 0.5 to 1.5 bar is usually selected.

The thermoplastic expanded polymer foams which can be obtained in this way preferably have cells having an average cell size in the range from 50 to 250 μm and a disperse phase in the cell walls of the thermoplastic expanded polymer foams which is stretched to form fibers and has an average diameter in the range from 10 to 1000 nm, particularly preferably in the range from 100 to 750 nm.

Foam Particles P2

As foam particles P2, use is made of foam particles which are different from P1, in particular foam particles composed of styrene polymers or polyolefins, e.g. expanded polypropylene (EPP), expanded polyethylene (EPE) or prefoamed, expandable polystyrene (EPS). It is also possible to use combinations of various foam particles. The polymers are preferably thermoplastic materials. It is also possible to use crosslinked polymers, for example radiation-crosslinked polyolefin foam particles.

The foam particles based on styrene polymers can be obtained by prefoaming EPS to the desired density by means of hot air or steam in a prefoamer. Final bulk densities below 10 g/l can be obtained here by single or multiple prefoaming in a pressure prefoamer or continuous prefoamer.

To produce insulation boards having a high thermal insulation capability, particular preference is given to using prefoamed, expandable styrene polymers which comprise athermanous solids such as carbon black, aluminum, graphite or titanium dioxide, in particular graphite having an average particle diameter in the range from 1 to 50 μm in amounts of from 0.1 to 10% by weight, in particular from 2 to 8% by weight, based on EPS, and are known, for example, from EP-B 981 574 and EP-B 981 575.

Particularly heat distortion-resistant and solvent-resistant foam particles P2 are obtained from expandable styrene polymers, for example α-methylstyrene-acrylonitrile polymers (AMSAN) such as α-methylstyrene-acrylonitrile copolymers or α-methyl-styrene-styrene-acrylonitrile terpolymers, whose production is described in WO 2009/000872. Furthermore, it is possible to use foam particles P2 based on styrene-olefin interpolymers or impact-modified styrene polymers such as high-impact polystyrene (HIPS).

The process can also be carried out using comminuted foam particles derived from recycled foam moldings. To produce the expanded polymer foams of the invention, the comminuted recycled foams can be used in a proportion of 100% or, for example, in proportions of from 2 to 90% by weight, in particular from 5 to 25% by weight, based on the foam particles P2, together with fresh material without significant impairment of the strength and the mechanical properties.

The foam particles P2 can likewise comprise additives, nucleating agents, plasticizers, halogen-comprising or halogen-free flame retardants, soluble and insoluble inorganic and/or organic dyes and pigments or fillers in customary amounts.

Production of the Expanded Polymer Foams of the Invention

The foam particles P1 used according to the invention display surprisingly good compatibility with the foam particles P2 and can therefore be fused with the latter. It is also possible to use prefoamed beads of different densities here. To produce the expanded polymer foams of the invention, preference is given to using foam particles P1 and P2 which each have a density in the range from 5 to 50 kg/m$^3$.

In one embodiment, the foam particles P1 and P2 can be mixed and sintered in a mold by means of hot air or steam. The mixture used preferably comprises from 10 to 95% by weight, particularly preferably from 15 to 80% by weight, foam particles P1 and from 5 to 90% by weight, particularly preferably from 20 to 85% by weight, foam particles P2.

In a further embodiment, the foam particles P1 and P2 can be introduced into a mold essentially without mixing and sintered by means of hot air or steam. For example, the foam particles P1 and P2 can be introduced in one or more layers into a mold and sintered by means of hot air or steam.

The process alternatives according to the invention enable expanded polymer foam moldings to be configured in a variety of ways and matched to properties and the desired use. For this purpose, it is possible to vary the ratios of amounts, the density or even the color of the foam particles P1 and P2 in the mixture. Moldings having unique property profiles result.

For this purpose, it is possible to use, for example, molding machines which are suitable for producing moldings having a different density distribution. These generally have one or more sliding elements which can be taken out after introducing the different foam particles P1 and P2 or during fusion. However, it is also possible for the one type of foam particles P1 or P2 to be introduced and fused and the other type of foam particles subsequently to be introduced and fused with the existing part of the foam moldings.

In this way, it is also possible to produce moldings, for example pallets for the transport of items, in which, for example, the ribs or bottoms are made of foam particles P1 and the remainder of the molding is made of foam particles P2.

Owing to the compatibility of the foam particles P1 and P2, virtually single-type recycling without breakup into the individual components is possible.

Use of the Expanded Polymer Foams of the Invention

Owing to their property profile which is in between foams made of expanded polypropylene (EPP) and foams made of expanded polystyrene (EPS), the expanded polymer foams of the invention are in principle suitable for the usual applications of the two types of foams.

Owing to their elasticity, they are used, in particular, for impact-damping packaging, as core material for motor vehicle bumpers, for interior trim of motor vehicles, as upholstery material and as thermal insulation material and acoustic insulation material. The expanded polymer foams of the invention are particularly suitable for producing packaging and damping materials or packaging having improved fracture and cracking resistance.

The expanded polymer foams of the invention are also suitable, owing to their elasticity, as interior lining of protective helmets such as skiing, motorcycle or bicycle helmets in order to absorb mechanical shocks or in the sports and leisure sector, core materials for surfboards.

Owing to the high thermal and acoustic insulation properties, applications in the buildings sector are also possible. For floor insulation, foam boards which are laid directly on the concrete floor are usually employed. This is particularly important in the case of floor heating because of the thermal insulation in a downward direction. Here, the hot water pipes are installed directly in appropriate profiles in the foam boards. A cement screed is applied on top of the foam boards and wood or carpet floors can then be laid on top of the screed. In addition, the foam boards act as footfall damping.

The moldings according to the invention are also suitable as core material for sandwich constructions in shipbuilding, aircraft construction, construction of wind energy plants and vehicle construction. They can be employed, for example, for producing motor vehicle parts such as trunk floors, parcel shelves and side door cladding.

The composite moldings are preferably used for producing furniture, packaging material, in house construction, in dry finishing and interior finishing, for example as laminate, insulation material, wall or ceiling elements. The novel composite moldings are preferably used in motor vehicle construction, e.g. as door cladding, dashboards, consoles, sun visors, bumpers, spoilers and the like.

Owing to the higher elasticity and cracking resistance compared to expanded polymer foams made of expandable polystyrene (EPS) combined with high compressive stiffness, the foam particles of the invention are particularly useful for producing pallets. To improve the durability of the pallets, they can, if appropriate, be adhesively bonded to wood, plastic or metal or enveloped on all sides with a plastic film, for example a film composed of polyolefins or styrene-butadiene block copolymers.

The present invention further provides for the use of the moldings according to the invention, preferably the wood materials according to the invention, for producing furniture, packaging materials, in house construction, in dry finishing or in interior finishing, for example as laminate, insulation material, wall or ceiling elements, or in motor vehicles.

EXAMPLES

Starting Materials for the Foam Particles P1:

Component A: Polystyrene having a melt volume index MVI (200° C./5 kg) of 2.9 cm$^3$/10 min (PS 158K from BASF SE, $M_w$=280 000 g/mol, viscosity number VN 98 ml/g)

Component B:

B1: Polyethylene LLDPE (LL1201 XV, Exxon Mobil, density 0.925 g/l, MVI=0.7 g/10 min, melting point 123° C.)

B2: Polyethylene ethylene-octene copolymer (Exact® 210 from Exxon Mobil, density 0.902 g/l, MVI=10 g/10 min, melting point 95° C.)

Component C:

C1 Styroflex® 2G66, thermoplastic elastic styrene-butadiene block copolymer from BASF SE, C2 Kraton G 1652, styrene-ethylene-butylene block copolymer from Kraton Polymers LLC Component D: Blowing agent: (95% of isopentane, 5% of n-pentane)

Component E: Talc (HP 320, Omyacarb)

Production of the Foam Particles P1:

The components A) to C) were melted at 240-260° C./140 bar in a Leitritz ZE 40 twin-screw extruder and admixed with talc as nucleating agent (component E) (see table 1). The blowing agent (component D) was subsequently introduced under pressure into the polymer melt and homogeneously incorporated into the polymer melt by means of two static mixers. The temperature was then reduced to 180°-195° C. by means of a cooler. After further homogenization in two further static mixers, the polymer melt was extruded at 200-220 bar at 50 kg/h through a perforated plate maintained at 240-260° C. (0.6 mm hole diameter with 7 nests×7 holes or 0.4 mm hole diameter with 7 nests×10 holes). The polymer strand was pelletized by means of underwater pelletization (11-10 bar underwater pressure at 40° C.-50° C. water temperature to give blowing agent-laden minigranules having a narrow particle size distribution (d'=1.2 mm at a hole diameter of 0.65 mm).

70% by weight of glyceryl tristearate (GTS) and 30% by weight of glyceryl monostearate (GMS) were used as coating components. The coating composition had a positive effect on the fusion of the prefoamed foam beads to produce the molding. The flexural strength could be increased to 250 or 310 kPa compared to 150 kPa for the moldings obtained from the uncoated pellets.

TABLE 1

Composition of the expandable polymer particles (EPS) in proportions by weight for producing the foam particles P1.1, P1.2 and P1.3

| Example | Comp. A [% by wt.] | Comp. B1 [% by wt.] | Comp. B2 [% by wt.] | Comp. C2 [% by wt.] | Comp. C1 [% by wt.] | Comp. E [% by wt.] | Comp. D [% by wt.] |
|---|---|---|---|---|---|---|---|
| P1.1 | 67.2 | 7.5 | 4.7 | 0.7 | 13.2 | 0.5 | 6.1 |
| P1.2 | 67.9 | 7.5 | 4.7 | 0 | 13.2 | 0.5 | 6.1 |
| P1.3 C | 81.1 | 7.5 | 4.7 | 0 | 0 | 0.5 | 6.1 |

A transmission electron micrograph (TEM) shows the disperse distribution of polyethylene (phase P1, light regions) and disperse distribution of styrene-butadiene block copolymer (phase P2, dark regions) in the blowing agent-comprising minipellets, which later contribute to elasticization of the foam. The PE domains of the blowing agent-laden minipellets have a size in the order of from 200 to 1000 nm, and the styrene-butadiene block copolymer domains have a size in the order of from 200 to 1500 nm.

The blowing agent-comprising pellets were prefoamed in an EPS prefoamer to give foam beads having a low density (17.7 kg/m$^3$).

Foam Particles P2:

Neopor® X 5300 (graphite-comprising expandable polystyrene from BASF SE) was prefoamed to a density of 16.1 kg/m$^3$.

Examples 1 to 23

Production of Moldings

Foam particles P1 and P2 were mixed in the ratio shown in table 2 and processed in an automatic EPS molding machine at a gauge pressure of 1.1 bar to produce moldings.

Various mechanical measurements were carried out on the moldings to confirm the elasticization of the foam. Significant elasticization compared to pure EPS is observed for the examples according to the invention, as can be seen from the very high resilience. The compressive strength at 10% compression was determined in accordance with DIN EN 826 and the flexural strength was determined in accordance with DIN EN 12089. The work of flexure was determined from the measured values for flexural strength.

Example 5C is a comparative experiment.

TABLE 2

Properties of the expanded polymer foams having different proportions of foam particles P1.1:

| | Example | | | | |
|---|---|---|---|---|---|
| | 1 | 2 | 3 | 4 | 5C |
| P1.1 | 95% | 60% | 40% | 20% | 0% |
| P2 | 5% | 40% | 60% | 80% | 100% |
| Density [g/l] | 17.7 | 17.3 | 16.8 | 16.6 | 16.1 |
| Work of flexure [Nm] | 5.4 | 4.2 | 3.7 | 3.1 | 2.7 |
| Flexural strength [kPa] | 250.7 | 247.9 | 243.5 | 239.3 | 228.3 |

The examples show that the foam particles P2 can be mixed over a wide range with the foam particles P1 used according to the invention. In this way, the mechanical properties, for example the work of flexure, can be set in a targeted manner.

TABLE 3

Work of flexure [Nm] of the expanded polymer foams having different proportions of foam particles P1.1

| | Example | | | | |
|---|---|---|---|---|---|
| | 6 | 7 | 8 | 9 | 10 |
| Proportion of P2 [% by wt.] | 5 | 20 | 40 | 60 | 80 |
| Proportion of P1.1 [% by wt.] | 95 | 80 | 60 | 40 | 20 |
| Work of flexure [Nm] | 5.5 | 5.0 | 4.2 | 3.7 | 3.1 |

TABLE 4

Work of flexure [Nm] of the expanded polymer foams having different proportions of foam particles P1.2

| | Example | | | | |
|---|---|---|---|---|---|
| | 11 | 12 | 13 | 14 | 15 |
| Proportion of P2 [% by wt.] | 5 | 20 | 40 | 60 | 80 |
| Proportion of P1.2 [% by wt.] | 95 | 80 | 60 | 40 | 20 |
| Work of flexure [Nm] | 4.2 | 4.0 | 3.5 | 3.3 | 3.2 |

TABLE 5

Work of flexure [Nm] of the expanded polymer foams having different proportions of foam particles P1.3 C

| | 16 | 17 | 18 | 19 | 20 |
|---|---|---|---|---|---|
| Proportion of P2 [% by wt.] | 5 | 20 | 40 | 60 | 80 |
| Proportion of P1.3C [% by wt.] | 95 | 80 | 60 | 40 | 20 |
| Work of flexure [Nm] | 3.1 | 2.8 | 2.9 | 3.0 | 2.7 |

The invention claimed is:

1. A process for producing expanded polymer foams which comprises sintering a mixture comprising foam particles P1 and P2 composed of different thermoplastic polymers or polymer blends, wherein the foam particles P1 are obtained by prefoaming expandable, thermoplastic polymer particles comprising
A) from 45 to 97.9 percent by weight of a styrene polymer,
B1) from 1 to 45 percent by weight of a polyolefin having a melting point in the range from 105 to 140° C.,
B2) from 0 to 25 percent by weight of a polyolefin having a melting point below 105° C.,
C1) from 0.1 to 25 percent by weight of a styrene-butadiene or styrene-isoprene block copolymer,
C2) from 0.0 to 10 percent by weight of a styrene-ethylene-butylene block copolymer,
D) from 1 to 15 percent by weight of a blowing agent,
E) from 0 to 5 percent by weight of a nucleating agent,
where the sum of A) to E) does not exceed 100% by weight, wherein foam particles P2 comprise expanded polypropylene (EPP) or prefoamed, expandable polystyrene (EPS), wherein the mixture used for producing the expanded polymer foams comprises from 10 to 95% by weight of foam particles P1 and from 5 to 90% by weight of foam particles P2, and wherein the foam particles P1 and P2 have a density in the range from 5 to 80 kg/m$^3$.

2. The process according to claim 1, wherein the foam particles P1 are obtained by prefoaming expandable, thermoplastic polymer particles comprising A) from 55 to 78.1 percent by weight of a styrene polymer, B1) from 7 to 15 percent by weight of a polyolefin having a melting point in the range from 105 to 140° C., B2) from 5 to 10 percent by weight of a polyolefin having a melting point below 105° C., C1) from 6 to 15 percent by weight of a styrene-butadiene or styrene-isoprene block copolymer, C2) from 0.8 to 3 percent by weight of a styrene-ethylene-butylene block copolymer, D) from 3 to 10 percent by weight of a blowing agent, E) from 0.3 to 2 percent by weight of a nucleating agent, where the sum of A) to E) does not exceed 100% by weight.

3. The process according to claim 1, wherein the expandable, thermoplastic polymer particles used for producing the foam particles P1 comprise general purpose polystyrene (GPPS) as styrene polymer A).

4. The process according to claim 1, wherein the expandable, thermoplastic polymer particles used for producing the foam particles P1 comprise polyethylene as polyolefin B1).

5. The process according to claim 1, wherein the expandable, thermoplastic polymer particles used for producing the foam particles P1 comprise a copolymer of ethylene and octene as polyolefin B2).

6. The process according to claim 1, wherein the expandable, thermoplastic polymer particles used for producing the foam particles P1 have a disperse phase having an average diameter in the range from 1 to 1500 nm.

7. The process according to claim 1, wherein foam particles P2 are different from P1 and are composed of styrene polymers or polyolefins.

8. The process according to claim 1, wherein the foam particles P1 and P2 are mixed and sintered in a mold by means of hot air or steam.

9. The process according to claim 1, wherein the foam particles P1 and P2 are introduced essentially without mixing into a mold and sintered by means of hot air or steam.

10. The process according to claim 9, wherein the foam particles P1 and P2 are introduced in one or more layers into a mold and sintered by means of hot air or steam.

11. An expanded polymer foam obtained according to claim 1.

* * * * *